United States Patent [19]

Gartland

[11] Patent Number: 5,405,125
[45] Date of Patent: Apr. 11, 1995

[54] BOW HOLDER

[76] Inventor: Robert H. Gartland, 9 Woodhill Rd., St. Cloud, Minn. 56301

[21] Appl. No.: 241,488

[22] Filed: May 12, 1994

[51] Int. Cl.⁶ .............................................. B23Q 1/00
[52] U.S. Cl. ........................................ 269/51; 269/71; 269/82; 269/97
[58] Field of Search ............. 269/47, 50, 51, 71, 269/76, 79, 82, 97, 98, 909

[56] References Cited

U.S. PATENT DOCUMENTS

| | | | |
|---|---|---|---|
| 2,564,566 | 8/1951 | Duffy | 269/79 |
| 4,066,250 | 1/1978 | Campbell | 269/94 |
| 5,224,691 | 7/1993 | Clark | 269/51 |

*Primary Examiner*—Robert C. Watson
*Attorney, Agent, or Firm*—Larkin, Hoffman, Daly & Lindgren, Ltd.

[57] ABSTRACT

A bow holder relates to a means of supporting a bow in a variety of positions in space while enabling the performance of work or other tasks to a bow and bow accessories. The archery manufacturers organization (AMO) industry standard of a threaded receptacle, usually a separate insert in the riser on the front of a bow, allows the bow holder to be attached to a bow thereby allowing the bow to be solidly supported in a vertical, horizontal, inverted, perpendicular or a combination of these positions relative to the work surface, as desired by the operator of the bow holder and the work to be performed. Use of the threaded receptacle to attach a bow to the bow holder is advantageous in that no contact is made with the painted surface or finished parts of a bow riser or lens.

13 Claims, 4 Drawing Sheets

BOW HOLDER

BACKGROUND OF THE INVENTION

1. Field of the Invention

The present invention generally relates to bow maintenance tools, and more particularly, pertains to a bow holder for positioning a bow in a multitude of planes while preserving the integrity of the bow.

2. Description of the Prior Art

It is common in normal practice to perform work on a bow while it is at rest on a table, bench or other flat surface. Such a common practice presents shortcomings of inaccessibility to certain parts of the bow without repositioning the bow, lack of a means of adequately securing the bow while the work is being performed, and generally does not allow the worker to utilize both hands for the intended tasks.

Other bow holding devices currently available are limb supporting devices and operate with a vise action either by supporting a bow at the lower limb or by hanging the bow from the upper limb. It is not unusual to inflict damage to the bow finish or other parts of the bow while using any of these current methods of support, as most of these known bow devices offer inadequate support after the bow is secured. Support of a bow by a limb may also apply torsional force on the limb, thereby resulting in twisting of a limb, an undesirable feature, while a bow is supported by the bow holding device.

SUMMARY OF THE INVENTION

The present invention overcomes the disadvantages of the prior art systems by providing a solution to the aforementioned shortcomings with a deliberate intent to allow positioning of a bow in a multitude of planes, while affording a stable means of supporting the bow while also allowing both hands to be fully free and while protecting the bow finish from scratches and chips inflicted by contact between the bow holding tool and the finished parts of the bow. The Archery Manufacturers Organization ("AMO") is comprised of archery equipment manufacturers and has established standards throughout the industry relating to certain fixtures, hole dimensions and placement of the fixtures and holes on bows to allow for interchangability of mounted bow accessories. The present inventive bow holder utilizes the AMO standard of a 5/16-24 SAE threaded receptacle on the front of a bow riser and uses this to connect the bow to the present inventive bow holder.

The present inventive bow holder may desirably be permanently mounted on a surface, or in the alternative, can remain portable by temporarily securing an optionally attached clamp to the edge of a table, bench or similar flat surface. A primary feature of the present inventive bow holder is to promote a more secure means of supporting a bow while holding the bow in varying positions that provide accessibility to parts of the bow for cleaning, repairing, tuning and other work.

Yet another important feature of the present inventive bow holder is to prevent damage to a bow caused by supporting the bow on any part of its finished surface or string system.

A further feature of the present inventive bow holder is to allow installation of the bow holder without the use of tools.

Yet another feature of the present inventive bow holder is to provide a secure means of supporting a bow which is compact and portable.

Still another feature of the present inventive bow holder is to allow a wide range of positionability of a bow while it is in the inventive bow holder.

BRIEF DESCRIPTION OF THE DRAWINGS

Other objects of the present invention and many of the attendant advantages of the present invention will be readily appreciated as the same becomes better understood by reference to the detailed description when considered in connection with accompanying drawings in which like reference numerals designate like parts throughout the figures thereof and wherein.

DETAILED DESCRIPTION OF THE PREFERRED EMBODIMENT(S)

Figure 1:
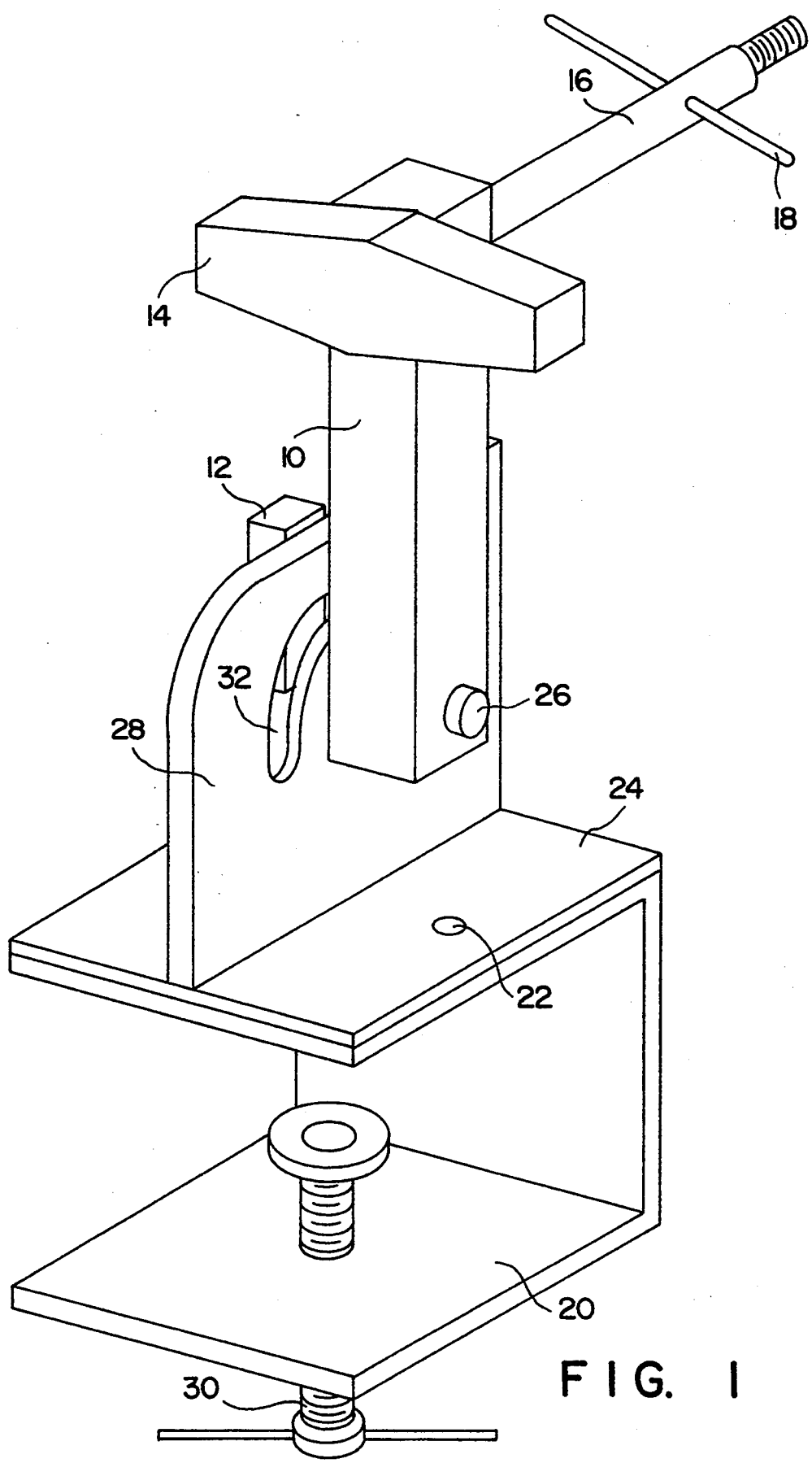
FIG. 1 is a perspective view of one preferred embodiment of the inventive bow holder secured to a mounting clamp.

FIG. 1 depicts a perspective view of one preferred embodiment for the present inventive bow holder wherein a clamp body 20 is rigidly secured to the base 24 of the holder via fasteners 22. At least one fastener 22 is required, but no less than two such fasteners 22 are utilized for the preferred embodiment. Preferably, the fasteners 22 are machine screws having the head of the machine screw counter-sunk to be flush with the base 24 of the inventive bow holder. Although a machine screw has been described in the preferred embodiment, it is to be understood that the present invention is not so limited. Other means may also be used to permanently fasten the bow holder to the clamp body 20 such as by welding.

The bow holder is designed with upright 10 pivoting around pivot pin 26 and is secured in any particular position throughout the range of the radius slot 32 in vertical bracket 28. Once upright 10 is positioned, it is held in place by the clamping force exerted by upright 10 against vertical upright 28 through means of a clamping device 12. Clamping device 12 may be a threaded clamping knob or simply a bolt.

It is to be understood that alternative methods of clamping may be used. For example, another method would include a use of an unslotted upright bracket 28 having a threaded bolt jammed through upright 10 and against vertical bracket 28.

The range of the slot 32 and vertical upright 28 is about 90° for the preferred embodiment. However, those skilled in the art will recognize that the invention is not so limited.

Although not shown in the preferred embodiment illustrated in FIG. 1, yet another pivoting point adding even greater flexibility in positionability can be added by making upright 10 in two separate pieces allowing one part to rotate independently of the other but on the same axis.

Figure 2:
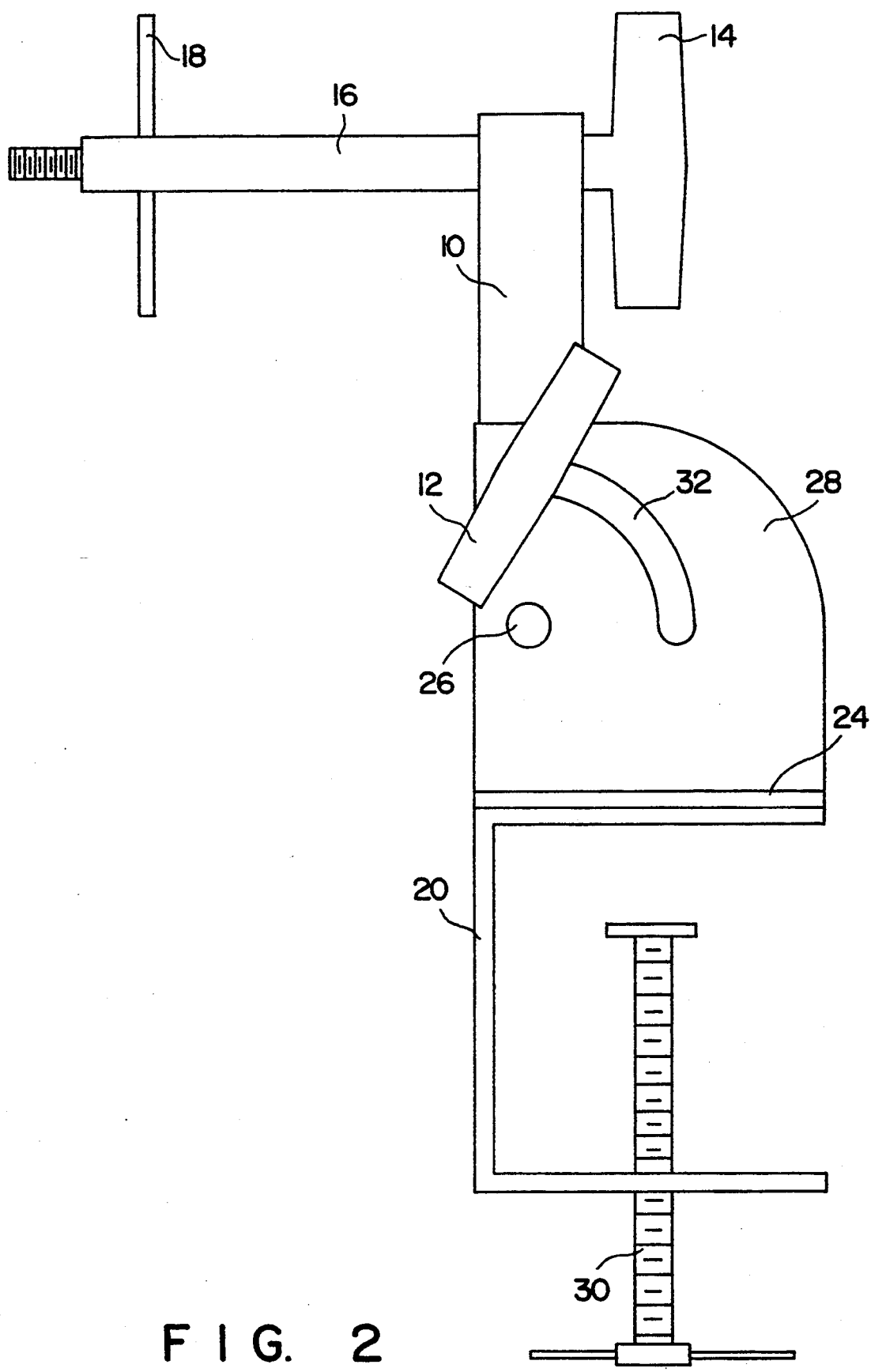
FIG. 2 illustrates a side view of the preferred embodiment for the present invention depicted in FIG. 1.

FIG. 2 illustrates a side view of the present inventive bow holder illustrated in FIG. 1. The entire holder may be made of a combination of metals including aluminum and carbon steel, but may also incorporate rigid plastics.

Figure 3:
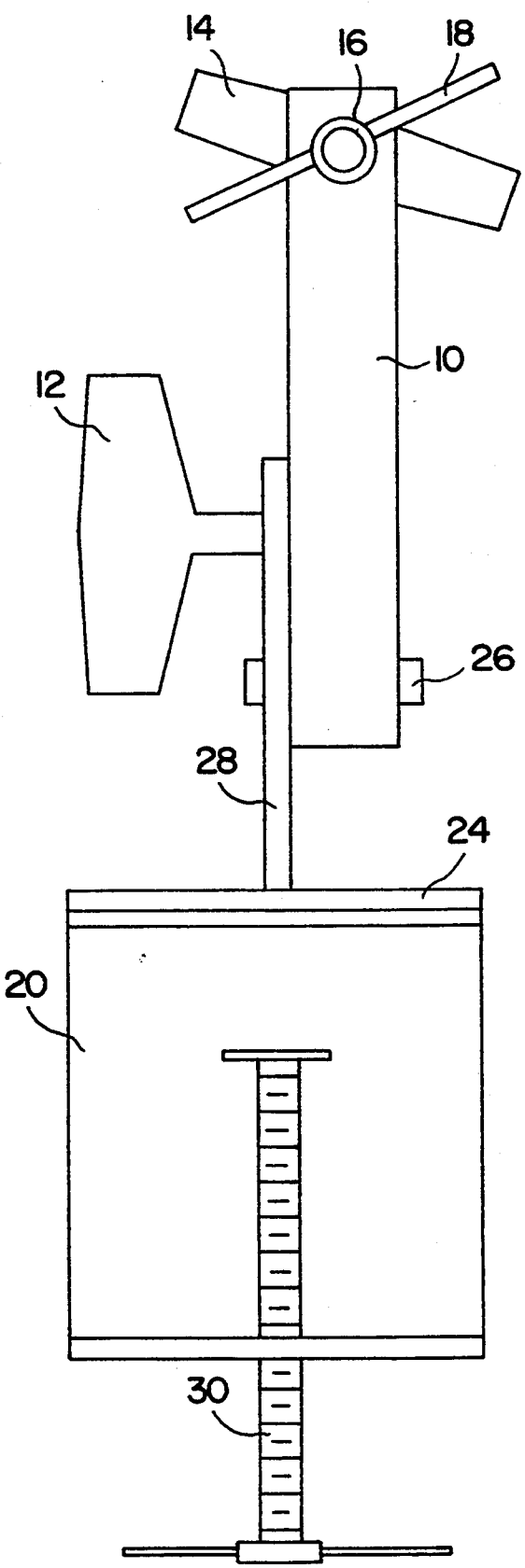
FIG. 3 illustrates a front view of the preferred embodiment for the present invention depicted in FIG. 1.

FIG. 3 shows a front view of the present inventive bow holder illustrated in FIG. 1.

Figure 4:
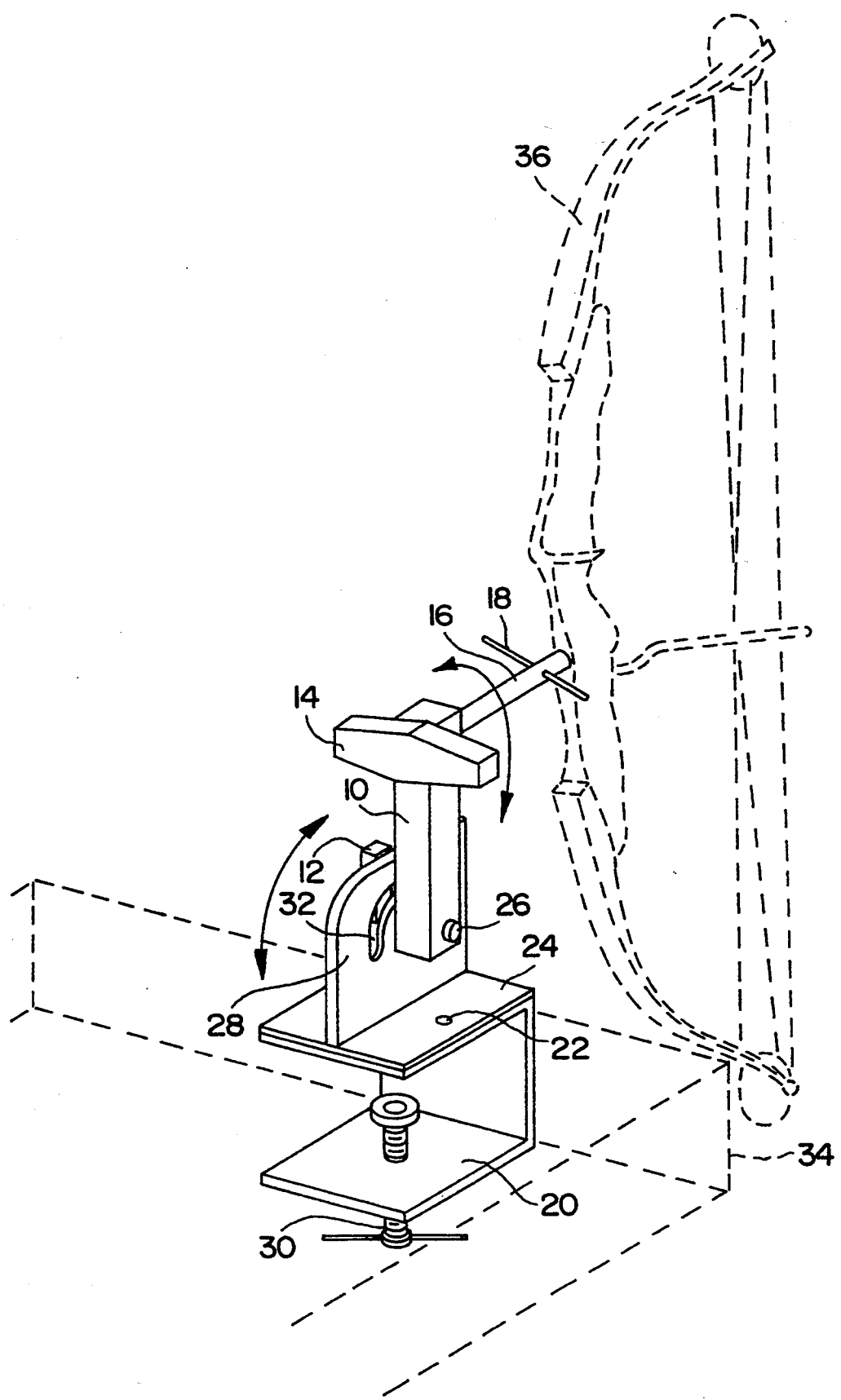
FIG. 4 depicts a perspective view of the present inventive bow holder having a bow attached to the holder using the AMO receptacle.

Moving now to FIG. 4, there is illustrated a perspective view with broken lines indicating a surface 34 upon which clamp 20 may be mounted and also illustrating a bow 36 attached to the inventive holder using the AMO mandrel 16. FIG. 4 clearly illustrates the bow 36 positions attainable using the present inventive bow holder. As stated hereinbefore, a bow 36 is attached via mandrel 16 which is readily threaded into the AMO receptacle on the bow riser. Pin 18 is provided to allow hand tightening and loosening of mandrel 16 into a bow 36. The mandrel 16 is inserted through upright 10 and is maintained in any of 360° by clamping knob which is like clamping device 12 described hereinbefore 14.

Use of the bow holder is achieved by first securing clamp 20 to the edge of the surface 34 or otherwise removing clamp 20 from the bow holder and then mounting the bow holder to the surface 34. Mandrel 16 is removed from the holder by removing clamping device 14 and sliding the mandrel 16 out of upright 10. Mandrel 16 is then threaded into the AMO standard 5/16-24 SAE threaded receptacle or insert on a bow 36 and tightened using pin 18 as the leverage point. The assembled bow 36 and mandrel 16 are then reattached to the bow holder by reinstalling mandrel 16 through upright 10, and firmly securing mandrel 16 and bow 36 by hand tightening clamping device 14. The bow 36 in the bow holder may now be positioned in a suitable work position by either or both of the following procedures: loosening clamping device 12 will allow the bow 36 to tilt away from the operator to the limits of the radius slot 32 in vertical upright 28 and will be held securely in the new position by retentioning clamping device 12. The bow 36 and the bow holder may also be rotated while in any of the position limits of the previous step by loosening clamping device 14, and then rotating the bow 36 to the desired position and retentioning clamping device 14. To remove a bow from the inventive bow holder, clamping device 14 may simply be loosened and the mandrel 16 unthreaded from the bow 36.

Although an exemplary embodiment of the present invention has been shown and described, it will be apparent to those having ordinary skill in the art that a number of changes, modifications or alterations to the invention as described herein may be made, none of which depart from the spirit of the present invention. All such changes, modifications and alterations should therefore be seen as within the scope of the present invention.

I claim:

1. A bow holder comprising:
   (a) a base having a top and a bottom;
   (b) a vertical member coupled to said top of said base, said vertical member having a radiused slot;
   (c) a pivoting member rotatably coupled to said vertical member, said pivoting member adapted to engage said radiused slot such that rotation of said pivoting member about a pivot point is limited to a radius determined by said radiused slot;
   (d) a first clamping means; and
   (e) a mandrel, said mandrel having a distal end removably coupled to said pivoting member via said first clamping means, said first clamping means being removably coupled to said distal end of said mandrel such that said mandrel can be decoupled from said pivoting member thereby allowing said mandrel to be coupled to a bow, said mandrel further having a threaded proximal end adapted to be coupled to a threaded insert on a bow riser, such that said bow is supported by said mandrel without contact with a bow limb.

2. The bow holder as claimed in claim 1 further comprising a mandrel rotating means coupled to said mandrel for rotating said mandrel to a predetermined position.

3. The bow holder as claimed in claim 2 wherein said predetermined position comprises any angular position about an axis through said mandrel.

4. The bow holder as claimed in claim 1 further comprising a second clamping means coupled to said pivoting member, said second clamping means adapted to engage said radiused slot for securing a predetermined rotational position for said pivoting member.

5. The bow holder as claimed in claim 3 further comprising a means coupled to said bottom of said base for securing said base to a substantially flat surface.

6. The bow holder as claimed in claim 4 further comprising a means coupled to said bottom of said base for securing said base to a substantially flat surface.

7. The bow holder as claimed in claim 5 wherein said securing means is attached to said base with at least one threaded fastener.

8. The bow holder as claimed in claim 4 wherein said securing means is attached to said base with at least one threaded fastener.

9. The bow holder as claimed in claim 5 wherein said securing means is welded to said base.

10. The bow holder as claimed in claim 4 wherein said securing means is welded to said base.

11. The bow holder as claimed in claim 3 wherein said base comprises means for securing said base to a substantially flat surface.

12. The bow holder as claimed in claim 4 wherein said base comprises means for securing said base to a substantially flat surface.

13. The bow holder as claimed in claim 4 wherein said predetermined rotational position is adjustable between about 0° and about 90° from a vertical position.

* * * * *